(12) United States Patent
Akeel et al.

(10) Patent No.: US 8,141,047 B2
(45) Date of Patent: Mar. 20, 2012

(54) DEPENDENT OBJECT FRAMEWORK FOR JUNIT TESTING AND SOFTWARE APPLICATION COMPONENT

(75) Inventors: Umair Akeel, Burlingame, CA (US); Justin Harding Gordon, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1109 days.

(21) Appl. No.: 11/970,366

(22) Filed: Jan. 7, 2008

(65) Prior Publication Data

US 2009/0178029 A1   Jul. 9, 2009

(51) Int. Cl.
*G06F 9/44* (2006.01)
*G06F 9/45* (2006.01)

(52) U.S. Cl. ............ 717/125; 717/124; 717/127

(58) Field of Classification Search ........ 717/124–130
See application file for complete search history.

(56) References Cited

U.S. PATENT DOCUMENTS

| | | | | |
|---|---|---|---|---|
| 6,262,491 B1* | 7/2001 | Kitajima et al. | ............ | 717/130 |
| 6,305,009 B1* | 10/2001 | Goor | ............ | 717/116 |
| 6,385,769 B1* | 5/2002 | Lewallen | ............ | 717/125 |
| 6,604,209 B1 | 8/2003 | Grucci et al. | | |
| 6,609,132 B1 | 8/2003 | White et al. | | |
| 6,618,852 B1* | 9/2003 | van Eikeren et al. | ............ | 717/108 |
| 6,721,941 B1* | 4/2004 | Morshed et al. | ............ | 717/127 |
| 6,741,997 B1 | 5/2004 | Liu et al. | | |
| 6,839,894 B1* | 1/2005 | Joshi et al. | ............ | 717/130 |
| 6,981,246 B2* | 12/2005 | Dunn | ............ | 717/127 |
| 7,024,660 B2* | 4/2006 | Andrade et al. | ............ | 717/124 |
| 7,055,140 B2* | 5/2006 | Bystricky et al. | ............ | 717/129 |
| 7,085,670 B2* | 8/2006 | Odom et al. | ............ | 702/127 |
| 7,171,588 B2* | 1/2007 | Friedman et al. | ............ | 714/38.12 |
| 7,272,822 B1* | 9/2007 | Riggins et al. | ............ | 717/124 |
| 7,272,823 B2* | 9/2007 | Ball | ............ | 717/125 |
| 7,299,382 B2* | 11/2007 | Jorapur | ............ | 714/38.14 |
| 7,299,454 B2* | 11/2007 | Pugh et al. | ............ | 717/125 |
| 7,316,004 B2* | 1/2008 | Sluiman et al. | ............ | 717/125 |
| 7,386,837 B2* | 6/2008 | Creamer et al. | ............ | 717/127 |
| 7,490,319 B2* | 2/2009 | Blackwell et al. | ............ | 717/124 |
| 7,546,577 B2* | 6/2009 | Do et al. | ............ | 717/108 |
| 7,565,647 B2* | 7/2009 | Davidov et al. | ............ | 717/140 |
| 7,644,395 B1* | 1/2010 | Frey et al. | ............ | 717/128 |
| 7,707,557 B1* | 4/2010 | Nikolov | ............ | 717/130 |
| 7,712,087 B2* | 5/2010 | Kogan et al. | ............ | 717/131 |
| 7,958,495 B2* | 6/2011 | Kelso | ............ | 717/124 |
| 2006/0123028 A1 | 6/2006 | Timothy Fong et al. | | |

OTHER PUBLICATIONS

Li et al, "SOS: Saving time in dynamic race detection with stationary analysis", ACM OOPSLA, pp. 35-49, 2011.*
Grechanik, "Finding errors in interoperating components", IEEE IWICS, pp. 1-20, 2007.*

(Continued)

*Primary Examiner* — Anil Khatri
(74) *Attorney, Agent, or Firm* — Mollborn Patents, Inc.; Fredrik Mollborn

(57) ABSTRACT

Methods and apparatus, including computer program products, implementing and using techniques for testing a software application component. A dependent object framework is provided. The dependent object framework includes a set of static methods, a set of dependent object files, and a set of properties files. A test program is received. The test program references one or more objects described by the set of dependent object files. The one or more objects are loaded using at least one of the static methods of the dependent object framework. The received test program is run and a result of the test program is displayed.

19 Claims, 3 Drawing Sheets

OTHER PUBLICATIONS

Ducournau et al, "Emprical assessment of object oriented implementations with multiple inheritance and static typing", ACM OOPSLA, pp. 41-60, 2009.*

Alameldeen et al, "Energy efficeint cach design using variable strength error correcting codes", ACM ISCA, pp. 461-471, 2011.*

Celi Jr, J. and WL Nusbickel. "Object Framework for Database Management and Connectivity." RD v41 n413 Sep. 1998 article 41393. 1998.

"Hierarchy for All Packages." http://junit.sourceforge.net/javadoc/overview-tree.html <retrieved Nov. 20, 2007> Copyright 1997-2004 JUnit.org.

Seale, Deryl "StrutsTestCase for JUnit v2.1.4" http://strutstestcase.sourceforge.net/ <retrieved Dec. 27, 2007> Copyright 2004 Deryl Seale.

"Javabeans Test Case" 459121. Research Disclosure. International Business Machines Corporation. Jul. 2002. pp. 1264-1266.

* cited by examiner

DEPENDENT OBJECT FRAMEWORK FOR JUNIT TESTING AND SOFTWARE APPLICATION COMPONENT

BACKGROUND

This invention relates to testing of software applications. As software development is moving to a distributed, multi-tiered and heterogeneous computing environment, the Java™ programming language has become one of the most popular programming languages for developing component-based, multi-tiered, distributed applications. For example, the J2EE (Java™ 2 Enterprise Edition) technology has integrated application clients and applets, web components (JSP and servlets), and Enterprise JavaBeans™ (EJB™) components. As is well-known to computer program developers, in a distributed environment it is crucial that different components are assembled cohesively to produce one integrated application.

Before this assembly takes place, it is necessary to properly unit test each component independently. Unit testing each component in isolation significantly reduces bugs and helps to ensure high-quality software. Unit testing is a piece of code written by a developer that exercises a very small, specific area of functionality of the code being tested. A common way of performing unit testing of a client-side Java™ application is to use the JUnit test framework. The JUnit test framework offers several benefits, such as simple framework for writing automated, self-verifying tests in Java™, support for test assertions, test suite development immediate test reporting, and has for these and many other reasons become a very popular testing tool.

However, it is typically difficult to devise database (or other external data repository) dependent JUnit tests. The reason is that the database will hold a complex graph of objects represented in the form of database rows in many different tables. The JUnit test writer must struggle to alter the database to a state where the database holds all of those rows representing the objects in exactly the right state before a tests runs, in order to properly perform the JUnit test. Similarly, the test writer may also have to figure out how to restore the database to the state the database was in right before the test was run. This is important as it may be necessary to run a single test multiple times, or to run a sequence of multiple, different tests. Furthermore, proper JUnit tests must never depend on other tests having run successfully. In other words, all tests must be able to run completely independently.

Various attempts have been made to achieve the necessary state changes for databases prior to running the texts. Some proposed solutions include using Java™ code to manually create all the objects as part of the test setup, using scripts to setup the database, or loading backup copies of the database. Manually creating all objects requires writing complex Java™ code over and over for each test. Using scripts or loading backup copies are typically very inconvenient methods, as they are slow and cumbersome to the point that they are often not practical, since the JUnit tests depend on the particular database (or other external source) that is used. Thus, it would be desirable to have a more flexible way to devise database (or other external data repository) dependent JUnit tests.

SUMMARY

In general, in one aspect, the invention provides methods and apparatus, including computer program products, implementing and using techniques for testing a software application component. A dependent object framework is provided. The dependent object framework includes a set of static methods, a set of dependent object files, and a set of properties files. A test program is received. The test program references one or more objects described by the set of dependent object files. The one or more objects are loaded using at least one of the static methods of the dependent object framework. The received test program is run and a result of the test program is displayed.

The invention can be implemented to include one or more of the following advantages. A test writer only needs to specify root dependencies for a test, that is, the test writer only needs to specify that the test depends on a particular object, even if that object itself depends on other objects. The tests can run quickly. The test setup is partly or fully reusable from one test to another, which facilitates quick test creation. There is no need to manually create all objects, to use scripts or to load backup copies, as is common practice today.

The details of one or more implementations of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

The various implementations of the invention described herein pertain to testing of software applications. In particular, a Dependent Object Framework (DOF) provides mechanisms that enable easy writing of JUnit tests that depend on objects stored in a database or in some other external repository, which must be in a given state before commencing the test. As a consequence of the DOF, comparatively little setup for the test is required by the test writer. Various implementations of the invention will now be described by way of example and with reference to the drawings. It should be noted that although the examples below refer to a database as a persistent store of objects, other persistent stores are also possible, such as a services layer, or any other type of conventional persistent store.

Figure 1:
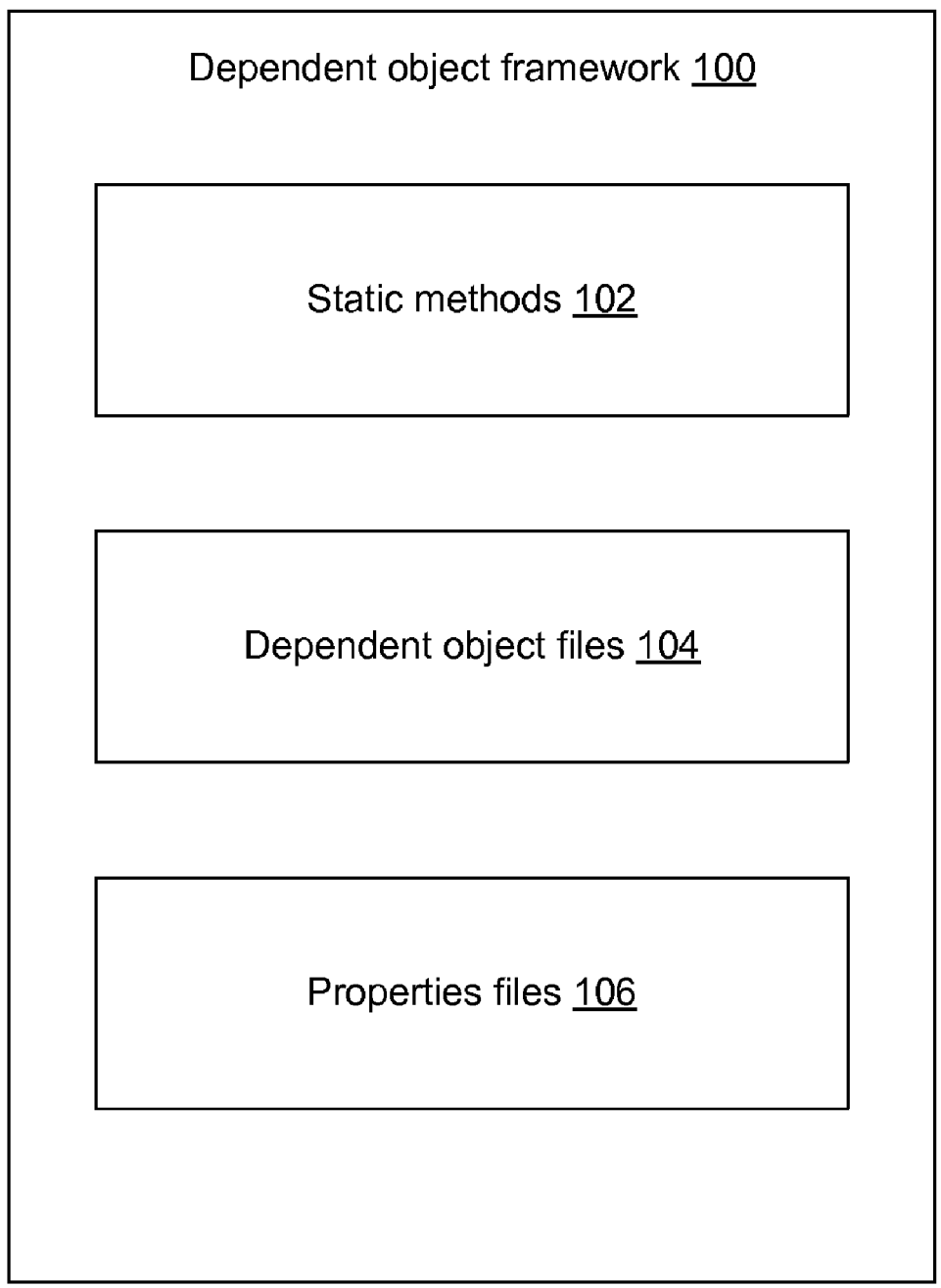
FIG. 1 shows a schematic view of a dependent object framework in accordance with one implementation of the invention.

As can be see in FIG. 1, in one implementation of the invention, the DOF (100) includes a set of static methods (102), a set of dependent object files (104), and a set of properties files (106). The static methods are used to load and delete dependent objects. In one implementation, the static methods includes a requires method and a delete( ) method, which will both be described in further detail below with reference to FIGS. 2 and 3.

The dependent object files (104) in accordance with one implementation of the invention are text files that each lists its own dependencies. In one implementation of the invention, the dependent object files (104) comply with the following naming convention: {object_type}.{object_primary_key}.{file_extension}. For example, "invoice.100.xml" indicates an invoice object with primary key 100. As will be discussed in further detail below, the dependent objects are loaded depth first and recursively deleted breadth first. For example, the "invoice.100.xml" object file can specify that it needs a "customer.25.xml" object file, that is, a customer record with primary key 25. Thus, for the invoice 100 to be created, the customer record 25 must first be created (or its existence must be verified). Similarly, customer record 25 cannot be deleted without first deleting invoice 100, since the invoice 100 depends from the customer record. It should be noted that the format of the dependent object files (104) and how the dependent object files (104) are processed are not specified by the dependent object framework (100). Thus, a dependent object file (104) can contain XML, Java™ code, or any other type of code that is capable of describing the object. Below are two examples of the "invoice.100.xml" dependent object file and the "customer.25.xml" dependent object file. As can be seen, the "customer.25.xml" dependent object file does not have any dependencies, whereas the "invoice.100.xml" dependent object file requires the "customer.25.xml" dependent object file as well as a "product.13.xml" dependent object file, a "product.14.xml" dependent object file, and a "product.15.xml" dependent object file.

```
invoice.100.xml
<!-- list of dependencies for invoice number 100 -->
            <!-- $require("customer.25.xml"); -->
            <!-- $require("product.13.xml"); -->
            <!-- $require("product.14.xml"); -->
            <!-- $require("product.15.xml"); -->
<invoice>
    <id>100</id>
    <customer_id>25</customer_id>
    <line_items>
            <line_item>
                <qty>5</qty>
                <product_id>13</product_id>
                <price>8.99</price>
            </line_item>
            <line_item>
                <qty>8</qty>
                <product_id>14</product_id>
                <price>4.99</price>
            </line_item>
            <line_item>
                <qty>4</qty>
                <product_id>15</product_id>
                <price>7.99</price>
            </line_item>
    </line_items>
    <subtotal>0</subtotal>
    <tax_rate>8.25</tax_rate>
    <shipping>15.40</shipping>
    <total>0</total>
</invoice>
customer.25.xml
<customer>
    <id>25</id>
    <name>John Smith</name>
</customer>
```

Finally, the dependent object framework (100) includes a set of properties files (102) that each maps an object type and a file suffix to a Java™ class that implements a DependentObjectHandler interface. One example of a DependentObjectHandler interface is shown below.

```
package com.ibm.dof;
public interface DependentObjectHandler
{
/**
```

```
* Insert the object into the DB. No check is done to see if *
the object already exists.
* @param fileToLoad File name in form:
* {objectType}.{objectPk}.{fileType}
* @return The type of object being created and saved in the * DB
*/
Object create(String fileToLoad);
/**
* Return the object, if it exists, with the given PK
* @param pk The primary key of the object to retrieve
* @return The object created from the db if it existed, or *
else null
*/
Object get(String pk);
/**
* Delete the object with the given pk. The framework will
* try to delete the objects dependencies as well. It is
* CRITICAL that this method not delete the requested object
* and return false if there are any existing dependencies
* upon this object. For example, if this is a request to
* delete a customer record and invoices depend upon this
* customer record, it must simply return false.
*
* @param pk The primary key of the object to delete
* @return true if requested object is deleted.
*
*/
boolean delete(String pk);
}
```

Figure 2:
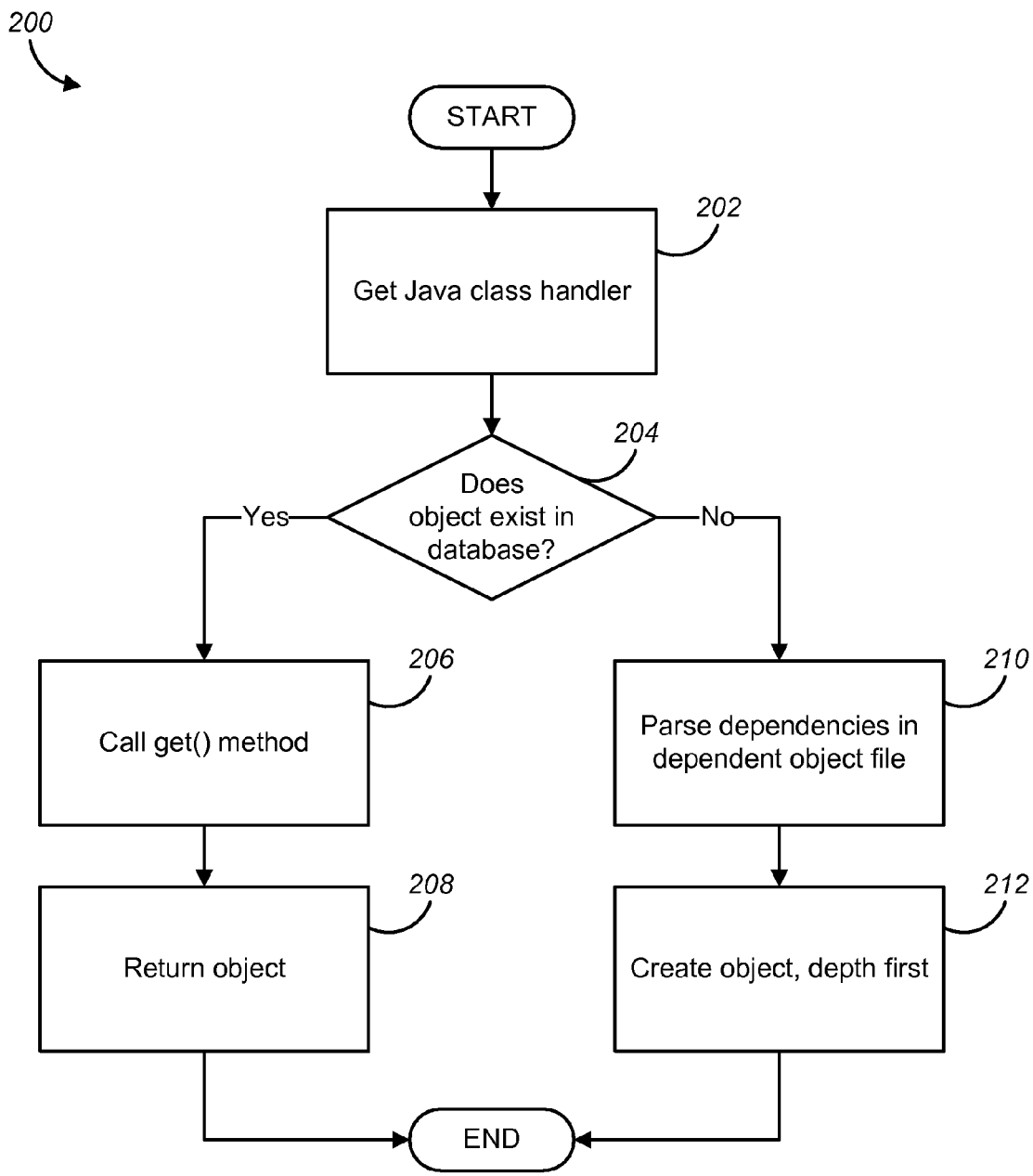
FIG. 2 is a flowchart of the DOF.require( ) method in accordance with one implementation of the invention.

FIG. 2 shows the DOF.require( )method (200) in accordance with one implementation of the invention. As can be seen in FIG. 2, the DOF.require( )method (200) starts by getting the appropriate Java™ class handler implementing the DependenObjectHandler interface (step 202). Next, it is determined if the object exists in the database (step 204). If the object does exist in the database, the get( )method is called (step 206) and the object is returned (step 208), which ends the DOF.require method (200). If it instead was determined in step 204 that the object does not exist in the database, then any dependencies inside the dependent object file (104) describing the object are parsed and loaded (step 210) using the above described steps. That is, the dependencies of the dependencies will get loaded. Thus, the loading is a recursive, depth first, loading. When the dependencies have been parsed and loaded recursively, the object specified is created, (step 212) using the create( )method of the class implementing the DependentObjectHandler interface, which ends the creation process and then the object requested is returned.

Figure 3:
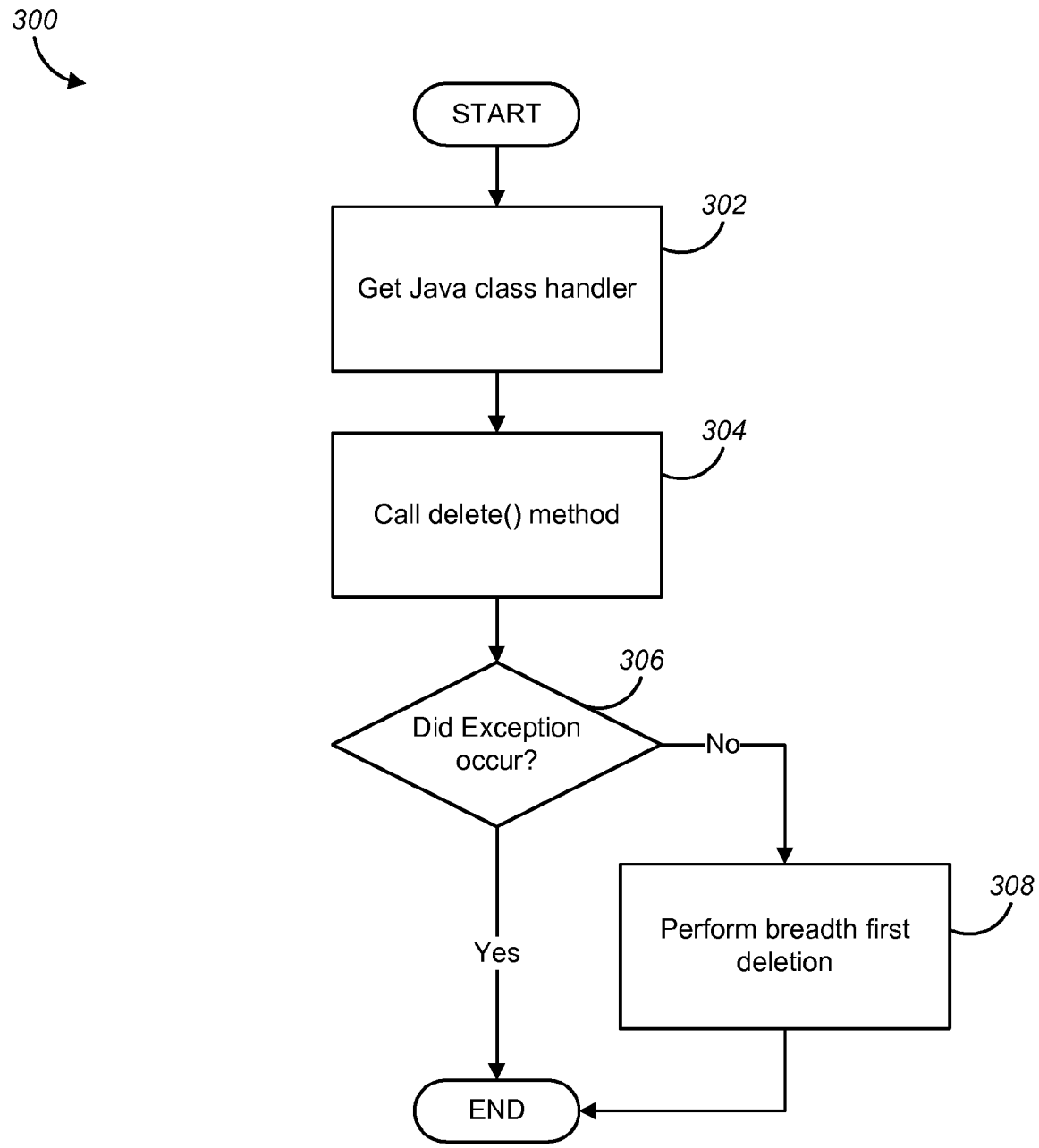
FIG. 3 is a flowchart of the DOF.delete( ) method in accordance with one implementation of the invention.

FIG. 3 is a flowchart of a DOF.delete( )method in accordance with one implementation of the invention. As can be seen in FIG. 3, the DOF.delete( )method (300) starts by getting the appropriate Java™ class handler implementing the DependenObjectHandler interface (step 302). Next, the DOF.delete( )method is called to delete the object (step 304). It is then determined if the DOF.delete( )method has thrown an exception (step 306). If the DOF.delete( ) method throws an exception, the process (300) stops. Otherwise, a breadth first deletion is done (step 308) on the objects listed as "requires" of the object being deleted. The process ends when there are no more objects to attempt deletion on.

An exemplary use scenario of the dependent object framework (100), which will facilitate the understanding of the above-described implementation, is as follows. Suppose that a JUnit writer needs to write a JUnit test that requires an Invoice object, and that the Invoice object depends on a Customer object and several Product objects, as was described above. The DOF enables the test writer to only specify that the invoice object is required, and that is all that is required if the setup files (i.e., the dependent object description files, along with the handler classes) exist for the Invoice and its dependencies. If the setup files do not exist, then the test writer may possibly need just another data file, for example representing invoice number 101 if invoice number 100 also exists. If there are no tests that use invoices, then the test writer needs to write a loader program to load invoice objects. The loader program is the class that implements the DependentObjectHandler interface. As was described above, one benefit of this technique is that the process for ensuring that objects exist in the database for a test is very clear.

The invention can take the form of an entirely hardware implementation, an entirely software implementation or an implementation containing both hardware and software elements. In a preferred implementation, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A number of implementations of the invention have been described. Nevertheless, it will be understood that various modifications may be made without departing from the spirit and scope of the invention. Accordingly, other implementations are within the scope of the following claims.

The invention claimed is:

1. A computer-implemented method for testing a software application component that uses objects stored in a persistent data store, the method comprising:

providing, by a computer, a dependent object framework, the dependent object framework including a set of static methods, a set of dependent object files, and a set of properties files;

receiving, by the computer, a test program for testing the software application component, the test program referencing one or more objects stored in the data store, the one or more objects being described by the set of dependent object files;

loading, by the computer, the one or more objects into the data store using at least one of the static methods of the dependent object framework, wherein loading the one or more objects further includes:

determining whether the one or more objects exist in the data store; and in response to determining that at least some of the objects do not exist in the data store, creating the at least some objects using a recursive depth first creation method;

running, by the computer, the received test program on the software application component; and displaying, by the computer, a result produced by the test program, the result indicating a functionality of the software application component.

2. The method of claim 1, wherein the software application to be tested is written in the Java™ programming language and the test program is a JUnit test program.

3. The method of claim 2, wherein each file in the set of properties files maps an object type and a file suffix to a Java™ class that implements a dependent object handler interface.

4. The method of claim 1, further comprising deleting the one or more objects using at least one of the static methods of the dependent object framework.

5. The method of claim 4, wherein deleting the one or more objects is done using a breadth first method.

6. The method of claim 1, wherein each dependent object file is a text file that specifies its own dependencies.

7. The method of claim 1, wherein each dependent object file has a file name including an object type, an object primary key, and a file extension 8. A computer program product for testing a software application component that uses objects stored in a persistent data store, the computer program product comprising:

a tangible computer readable storage medium having computer readable program code embodied therewith, the computer readable program code comprising:

computer readable program code configured to provide a dependent object framework, the dependent object framework including a set of static methods, a set of dependent object files, and a set of properties files;

computer readable program code configured to receive a test program for testing the software application component, the test program referencing one or more objects stored in the data store, the one or more objects being described by the set of dependent object files;

computer readable program code configured to load into the data store the one or more objects using at least one of the static methods of the dependent object framework, wherein the computer readable program code configured to load the one or more objects further includes:

computer readable program code configured to determine whether the one or more objects exist in the data store; and computer readable program code configured to, in response to determining that at least some of the objects do not exist in the data store, create the at least some objects using a recursive depth first creation method;

computer readable program code configured to run the received test program on the software application component; and computer readable program code configured to display a result produced by the test program, the result indicating a functionality of the software application component.

9. The computer program product of claim 8, wherein the software application to be tested is written in the Java™ programming language and the test program is a JUnit test program.

10. The computer program product of claim 9, wherein each file in the set of properties files maps an object type and a file suffix to a Java™ class that implements a dependent object handler interface.

11. The computer program product of claim 8, further comprising:
   computer readable program code configured to delete the one or more objects using at least one of the static methods of the dependent object framework.

12. The computer program product of claim 11, wherein deleting the one or more objects is done using a breadth first method.

13. The computer program product of claim 8, wherein each dependent object file is a text file that specifies its own dependencies.

14. The computer program product of claim 8, wherein each dependent object file has a file name including an object type, an object primary key, and a file extension.

15. An apparatus, comprising:
   a processor;
   a memory coupled to the processor; and
   a dependent object framework mechanism for use in testing a software application component that uses objects stored in a persistent data store, wherein the dependent object framework mechanism resides in the memory and is executable by the processor, and wherein the dependent object framework mechanism includes:
   a set of static methods, operable to load and delete dependent objects in the persistent data store, the static methods further including methods operable to:
   determine whether the one or more objects exist in the data store; and
   in response to determining that at least some of the objects do not exist in the data store, create the at least some objects using a recursive depth first creation technique;
   a set of dependent object files, operable to be referenced by a test program for testing the software application component, the dependent object files describing one or more objects stored in the data store; and
   a set of properties files, operable to map an object type and file suffix to a class that implements a dependent object handler interface.

16. The apparatus of claim 15, wherein the software application component to be tested is written in the Java™ programming language and the test program is a JUnit test program.

17. The apparatus of claim 15, wherein the set of static methods are operable to delete the one or more objects using a breadth first technique.

18. The apparatus of claim 15, wherein each dependent object file is a text file that specifies its own dependencies.

19. The apparatus of claim 15, wherein each dependent object file has a file name including an object type, an object primary key, and a file extension.

* * * * *